(12) United States Patent
Hansen et al.

(10) Patent No.: US 9,315,395 B2
(45) Date of Patent: Apr. 19, 2016

(54) WATER TREATMENT SYSTEM

(75) Inventors: Christopher L. Hansen, Newbury, OH (US); Peter Halemba, Russell, OH (US)

(73) Assignee: Kinetico Incorporated, Newbury, OH (US)

( * ) Notice: Subject to any disclaimer, the term of this patent is extended or adjusted under 35 U.S.C. 154(b) by 1005 days.

(21) Appl. No.: 13/111,254

(22) Filed: May 19, 2011

(65) Prior Publication Data

US 2011/0284434 A1    Nov. 24, 2011

Related U.S. Application Data

(60) Provisional application No. 61/346,221, filed on May 19, 2010.

(51) Int. Cl.
| | |
|---|---|
| *C02F 1/00* | (2006.01) |
| *C02F 1/42* | (2006.01) |
| *B01J 49/00* | (2006.01) |
| *B01D 24/46* | (2006.01) |

(52) U.S. Cl.
CPC .............. *C02F 1/42* (2013.01); *B01J 49/0095* (2013.01); *C02F 1/008* (2013.01); *B01D 24/4647* (2013.01); *C02F 2201/005* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 2,689,006 | A | * | 9/1954 | Lindsay .......................... 74/3.54 |
| 3,891,552 | A | | 6/1975 | Prior et al. |
| 4,298,025 | A | | 11/1981 | Prior et al. |
| 4,427,549 | A | | 1/1984 | Brown et al. |
| 6,214,214 | B1 | * | 4/2001 | Hansen et al. ................ 210/106 |

* cited by examiner

*Primary Examiner* — Terry Cecil
(74) *Attorney, Agent, or Firm* — Tarolli, Sundheim, Covell & Tummino LLP

(57) ABSTRACT

A water treatment system including a pair of water treatment tanks, each tank defining a flow path extending from a tank inlet to a tank outlet and containing a water treatment material disposed along the flow path for treating water as it travels from the inlet to the outlet. A system controller controls which of the tanks is on-line and which of the tanks is off-line and controls the regeneration of an exhausted tank. A multi-stage, spring-loaded control valve assembly controls the communication of fluid to a regeneration control turbine and includes a piston head and a relatively movable seat-carrying stem. A spring urges the stem away from the piston head such that initial movement of the head compresses the spring but does not produce movement in the seat. Sufficient movement of the piston head produces movement in the seat, thereby causing the seat to open pressure.

7 Claims, 7 Drawing Sheets

WATER TREATMENT SYSTEM

PRIORITY

The present invention claims priority to U.S. Provisional Application Ser. No. 61/346,221, filed May 19, 2010, the entirety of which is incorporated herein by reference in its entirety.

TECHNICAL FIELD

The present invention relates generally to fluid treatment and in particular to an improved control system and control device for controlling a fluid treatment apparatus.

BACKGROUND OF THE INVENTION

U.S. Pat. No. 4,298,025, which is owned by the present assignee, discloses a control valve for use in water softeners having two resin tanks. One of the resin tanks is normally on-line while the other tank is regenerated and placed in a standby condition until the first tank requires regeneration. The disclosed control valve controls which of the tanks is on-line and controls the regeneration sequence of an exhausted tank.

The quantity of water treated by a given tank, is monitored by a mechanism that includes a water usage turbine driven by water entering the on-line resin tank. When a predetermined quantity of water is treated, which produces a predetermined number of revolutions in the turbine, a regeneration sequence is initiated which places the standby tank on-line and isolates the exhausted tank.

A second turbine, operatively connected to a regeneration sequence control element (in the form of a disk) is rotated by a stream of water that is activated at the beginning of the regeneration cycle. The stream of water physically drives the regeneration control disk (via the turbine and associated drive train) through its sequence. With the disclosed arrangement, the frequency of regeneration of the water softener system is determined by the usage turbine which directly measures the quantity of fluid treated by a given tank.

SUMMARY OF THE INVENTION

The present invention provides a new and improved control valve for controlling a fluid treatment apparatus such as a deionization system or a water softener. In the illustrated embodiment, the improved control valve is used to control a fluid treatment system having a pair of resin tanks, one of which is on-line, while the other is regenerated and held in a standby condition. The disclosed control valve, although similar to the control valves described in U.S. Pat. Nos. 4,298,025 and 4,427,549, which are hereby incorporated by reference, includes several improvements which enhance the overall operation of a fluid treatment system that utilizes the control valve.

According to the invention, a water treatment apparatus is disclosed including at least one treatment tank containing a treatment material The tank defines a fluid flow path through which water to be treated is passed. The treatment tank may form part of a water softener, deionization unit or a mechanical filter. A control unit similar in construction to the control valve illustrated in U.S. Pat. Nos. 3,891,552 and 4,298,025 controls the communication of water to be treated (or a water source) with a tank inlet and controls the communication of treated water from a tank outlet and a conduit or system outlet. In the illustrated embodiment, the control unit also has a regeneration controller that controls the regeneration of the tank when needed.

According to the invention, a water treatment apparatus is disclosed and includes at least one water treatment tank defining a fluid flow path extending from the tank to a tank outlet; the treatment tank includes a water treatment media disposed in a flow path. A regeneration determining apparatus that includes a water driven turbine determines when the treatment media requires regeneration. According to the invention, regeneration is initiated by the opening of a control valve assembly embodying the present invention. The control valve assembly is spring loaded so that it provides a two-stage opening. The control valve includes a piston head that carries a peripheral seal, sealingly engaged with an associated bore. One end of a stem is slidably received within a piston bore and carries a seat at its other end which is sealingly engageable with a seat-sealing surface. The stem is urged in an axial direction away from the piston head, preferably by a coil spring, located in the piston head bore that acts between the end of the stem and the piston head.

According to the invention, the control valve assembly is opened by applying a signal pressure to the piston head which moves it in an opening direction. Initial movement of the piston head does not produce movement in the stem due to the coil spring acting between the stem and the piston head. During this initial movement of the piston head, the seat remains engaged with the associated sealing surface due to fluid pressure acting on the seat. Once the spring is compressed, further movement of the piston head moves the seat off the sealing surface. Once the seat is open even a small amount, the closing force on the seat is reduced and thereby allows the spring to move the seat away from the piston head. This results in further movement of the seat away from the sealing surface, thus fully opening the valve.

In accordance with a more preferred embodiment of the invention, the apparatus includes a second tank and the control unit is operative to control which of the tanks is on-line and which of the tanks is regenerated and then kept off-line until the on-line tank requires regeneration.

It has been found, that with the present invention, the apparatus can operate at lower source inlet pressures. In particular, in the past it was found that the control valve for establishing the communication of fluid pressure to the regeneration turbine could stall due to insufficient inlet pressure available to open the valve. In the past, attempts were made to alleviate this problem by reducing friction between the piston head seal and its associated bore. This involved tightening manufacturing tolerances with respect to the bore and the associated piston seal. The present invention allows the use of seals with increased friction, thereby reducing chances of leakage, etc., without comprising the ability of the control valve to open under lower inlet pressures.

A fuller understanding will be obtained and additional features of the invention will become apparent in reading the following detailed description made in connection with the accompanying drawings.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
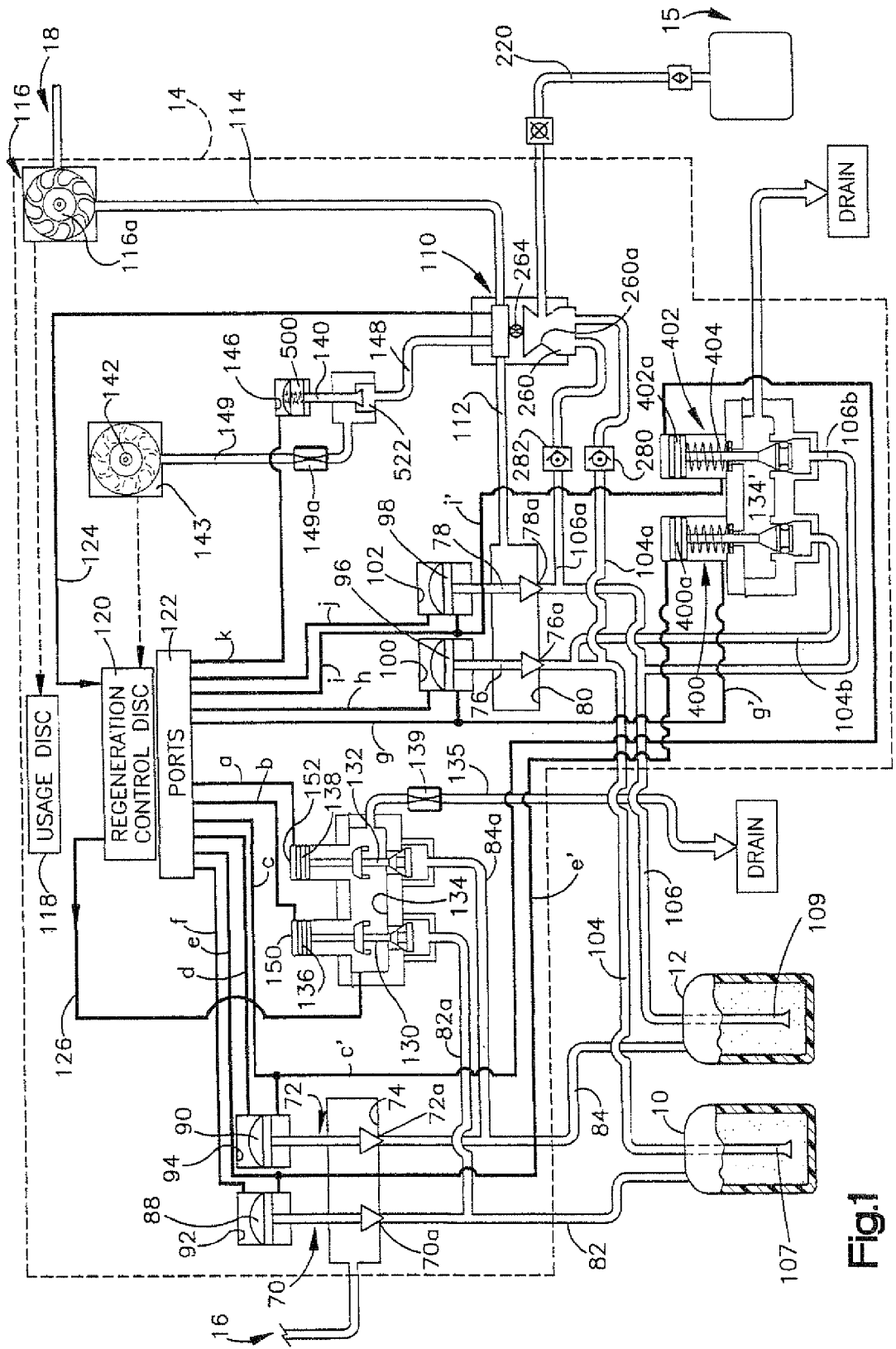
FIG. 1 is a is a schematic representation of a water treatment system embodying the present invention.

FIG. 1 schematically illustrates a water treatment system constructed in accordance with the preferred embodiment of the invention. The system includes a pair of resin tanks 10, 12 interconnected by a control valve module 14 that is similar to the control valves described in U.S. Pat. Nos. 4,298,025 and 3,891,552 which are hereby incorporated by reference. A source of regeneration solution indicated generally by the reference character 15 is connected to the valve 14.

The control valve assembly 14 controls the communication of a source of water to be treated, indicated generally by the reference character 16 with the treatment tanks 10, 12; the communication of the tanks with an outlet indicated by the reference character 18; and, the regeneration of an exhausted tank.

The valve assembly 14 includes a plurality of water pressure operated valves, the opening and closing of which are controlled by a fluid signal control system. Whether the tanks 10, 12 are on-line or off-line is determined by a pair of inlet valves 70, 72 disposed in an inlet chamber 74 and a pair of outlet valves 76, 78 disposed in an outlet chamber 80. The inlet conduit 16 fluidly communicates with the inlet chamber 74. The inlet valves 70, 72 control the communication between the inlet chamber 74 and respective tank inlet passages 82, 84. Opening the valves 70, 72 allows feed water in the inlet conduit 16 to proceed into the tanks 10, 12, respectively.

The valves 70, 72 are operatively connected to a piston 88, 90 disposed in chambers 92, 94, respectively. The application of fluid pressures above the pistons apply valve closing forces to urge the valves 70, 72 into engagement with respective valve seats 70a, 72a. The application of fluid pressure to the underside of the pistons exerts valve opening forces.

The outlet valves 76, 78 are similarly configured and include pistons 96, 98 disposed in chambers 100, 102. The application of fluid pressure above and below the pistons 96, 98 applies valve closing and opening forces, respectively for moving the valves 76, 78 towards and away from associated valve seats 76a, 78a.

The valves 76, 78 control the communication between tank outlet passages 104, 106 of the tanks 10, 12, respectively with the outlet chamber 80. The outlet passages 104, 106 are connected to the top of the tanks 10, 12 and are in fluid communication with respective risers 107, 109. The risers extend downwardly from the top of the tanks and open near the bottom of the respective tanks. In normal service, water to be treated is introduced at the top of the tank by an associated inlet passage 82, 84. The water travels downwardly through a treatment media located in the tank and is discharged from the tank by way of the associated riser. In short, the treated water leaves from the bottom of the tanks 10, 12 and travels upwardly through the riser tubes 107, 109 and into the respective outlet passages 104, 106.

When either of the valves are open, water flow from the associated tank is allowed to proceed to a water collection chamber 110 by way of a passage 112. The collection chamber 110 communicates with the outlet conduit 18 through a fluid path that includes a passage 114 and an outlet chamber 116 that includes a rotatable turbine 116a. As fully described in U.S. Pat. Nos. 3,891,552 and 4,298,025, the turbine is mechanically coupled to a usage monitoring disk 118 (shown in FIGS. 2A and 2B) which rotates as a function of the amount of water discharged through the outlet chamber 116 into the outlet conduit 18.

Figure 2A:
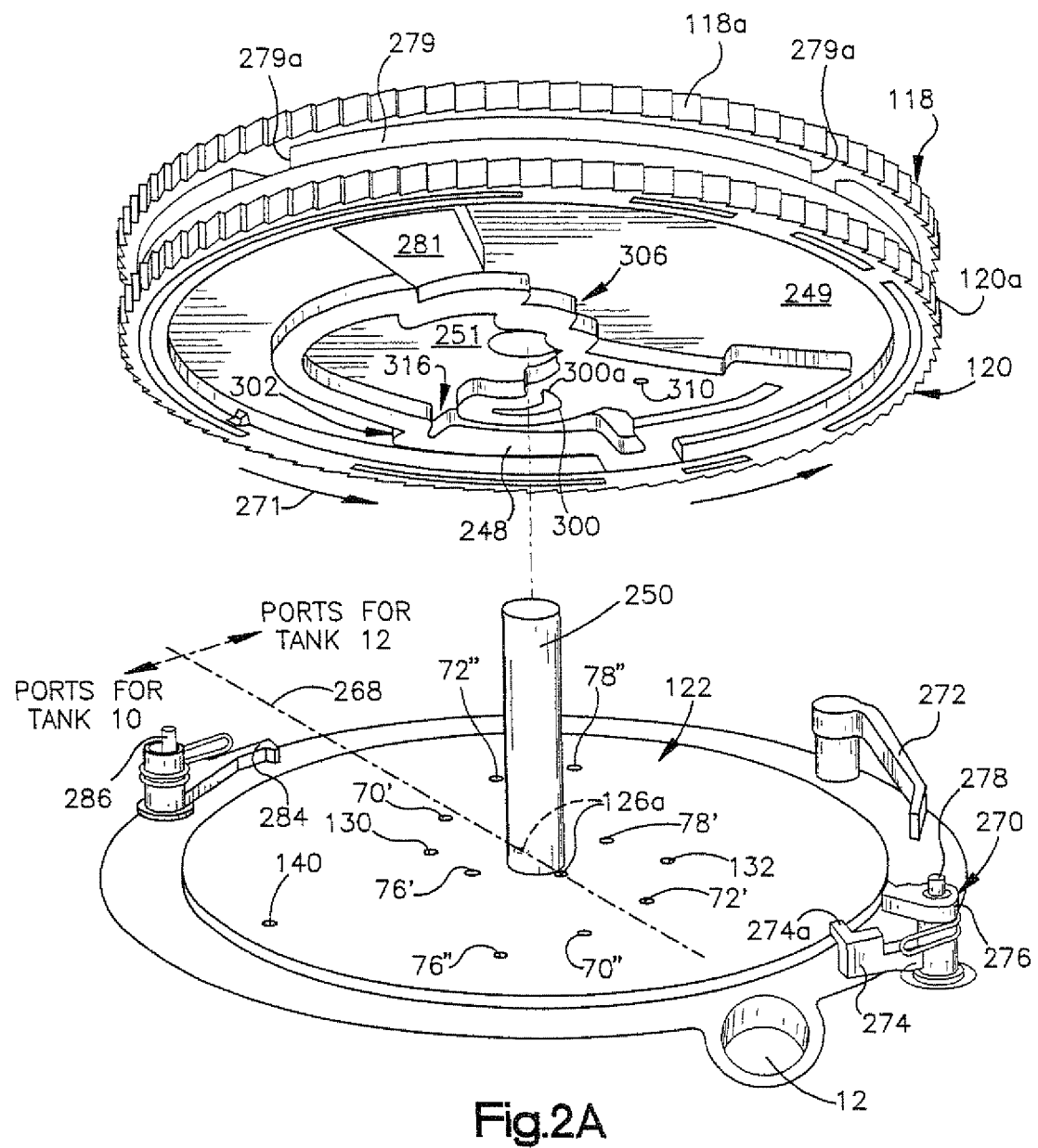
FIG. 2A is a perspective view of a regeneration control disc and associated port insert forming part of the present invention.
Figure 2B:
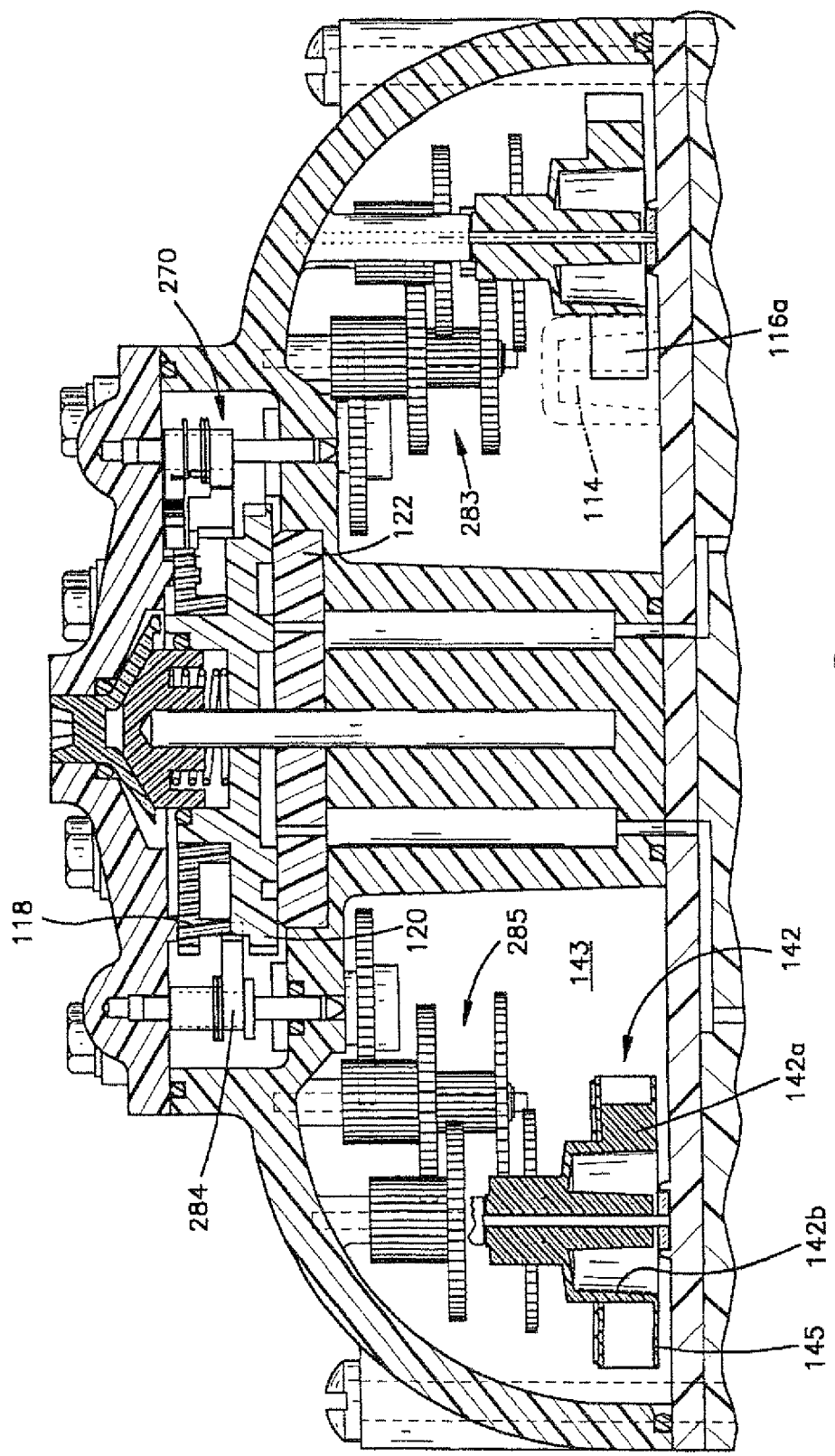
FIG. 2B is a fragmentary, sectional view of a control valve shown schematically in FIG. 1.
Figure 3:
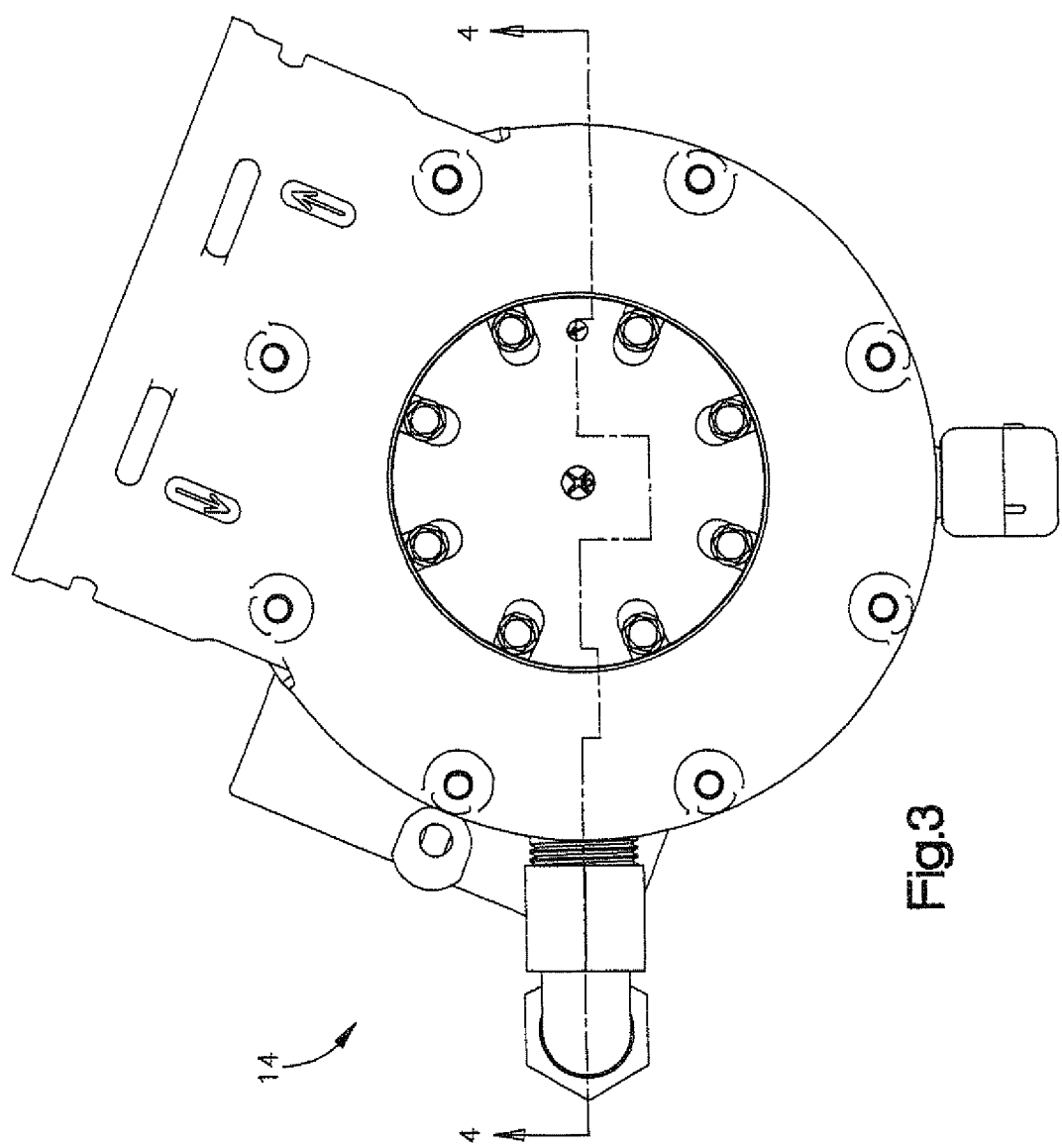
FIG. 3 is a top plan view of the control valve.

Referring also to FIGS. 2A and 2B, the usage monitoring disk 118 cooperates with a regeneration control disk 120. The control disk rotates atop an annular insert 122 that defines a plurality of ports each communicating with an associated signal line. Signal lines a-k are illustrated in FIG. 1. Each line extends from the port insert 122 to one of a plurality of piston chambers. The control disk 120 sealingly engages the top surface of the insert 122 and includes structural formations that operate to communicate the ports formed in the insert 122 with either water supply pressure (supplied by a passage 124) or ambient pressure (by communicating the ports with one of two drain passages 126a), shown in FIG. 2. In FIG. 1, the drain passages 126a are represented by a single drain line designated as 126. The ports and regeneration control disk 120 are arranged so that as the regeneration wheel 120 rotates, the valves are sequentially operated in order to cycle an exhausted tank through a regeneration cycle.

In addition to the valve elements described above, the control valve assembly 14 also includes a pair of drain valves 130, 132 for controlling the communication of the tank inlet passages 82, 84, respectively, with a drain chamber 134 through respective branch passages 82a, 84a. The drain chamber 134 communicates with ambient pressure drain through a drain conduit 135.

The drain valves 130, 132 are operated by pistons 136, 138 disposed in respective piston chambers 150, 152. In the preferred embodiment, the pistons are single acting and are driven to a valve open position by the application of fluid pressure to their top surfaces via signal lines a, b. When the fluid signals applied to the top piston surfaces is terminated, the drain valves 130, 132 are returned to their closed positions by a biasing force generated on the underside of the pistons by back pressure developed in the drain chamber 134. The back pressure in the drain chamber 134 is developed due to a flow restrictor 139 disposed in the drain conduit. As the drain valves near their closed positions, fluid pressure in the conduits 82a, 84a apply additional force to the valve heads tending to fully close the valves and maintain their closure. In an alternate embodiment, biasing springs (not shown) bias the valves towards their closed positions illustrated in FIG. 1 when the associated signal lines a, b are depressurized.

A regeneration control valve 140 constructed in accordance with the present invention controls the communication of water pressure from the water collection chamber 110 to a regeneration control turbine 142 located in a turbine chamber 143. The valve 140 includes a single acting piston 500 disposed in a chamber 146. The valve 140 is biased to its closed position by back pressure generated by a flow restrictor 149a disposed in a delivery passage 149 which controls the flow rate of water from the collection chamber 110 communicated through a passage 148, when the valve 140 is opened. When the regeneration control valve 140 is opened (by the application of a fluid signal to the top surface of the piston by way of the signal line k) water pressure is allowed to proceed from the passage 148 to the passage 149 which includes a nozzle for directing water against the turbine 142. The turbine 142 is mechanically coupled to the regeneration control disk 120 so that rotation of the turbine effects rotation of the control disk.

The application of fluid signals to the various piston chambers, as controlled by the relative movement of the regeneration control wheel with respect to the port insert 122, determines the sequence of valve actuation. The control disk 120 selectively communicates either water pressure from the collection chamber (fed to the disk by the pressure line 124) or the ambient drain pressure via the passage 126 (which communicates with the drain ports 126a shown in FIG. 2A), to the various signal lines.

The regeneration components include a regeneration fluid aspirator 260 disposed in the collection chamber 110. The aspirator comprises a fluid flow regulating element 264 and a venturi 260a. The outlet of the venturi communicates with the tank outlet passages 104, 106 through branch passages 104a, 106a that include check valves 280, 282. The throat of the venturi communicates with the source of regeneration solution 15.

When either of the drain valves 130, 132 are opened (and the respective inlet and outlet valves are both closed), water in the collection chamber 110 is allowed to proceed through the venturi 260a and into the tank being regenerated. For example, suppose the drain valve 130 is opened. Water from the collection chamber will flow through the venturi 260a into the outlet passage 104 of the tank 10 (via passage 104a). The water will then travel through the tank assembly 10 in a counterflow direction and be ultimately discharged to the ambient drain by way of the inlet passage 82, the branch passage 82a and the drain chamber 134. As water passes through the venturi, regeneration fluid is drawn from the regeneration source 15 through a supply conduit 220 and mixed or "aspirated" with the venturi fluid. The regeneration fluid (now diluted with treated water) passes through the tank being regenerated. The effluent from the tank is discharged to drain via the drain chamber 134.

The sequence of regeneration steps as well as the frequency of regeneration is controlled by the regeneration control disk 120 and the usage disk 118, respectively. Referring to FIGS. 1, 2A and 2B, the regeneration control disk 120 sealingly engages and rotates atop the circular port-defining insert 122. The ports defined by the insert 122 communicate with the various piston chambers. The underside of the regeneration control disk 120 includes a depending wall 248 that divides the underside of the disk 120 into pressurized and drain regions 249, 251. The port insert 122 includes a pair of drain apertures 126a located on either side of an upwardly extending stub shaft 250 about which both the regeneration control disk 120 and the water usage disk 118 rotate. The drain apertures 126a communicate with the drain chamber 134 through the passage 126 (shown in FIG. 1) which is integrally formed in the valve body. Thus, the drain region of the regeneration control disk is maintained at the ambient drain pressure.

Two sets of ports are provided in the insert 122 and are located symmetrically about an imaginary diametral line 268. The ports to the left of the line 268 control the regeneration sequence for the tank 10 whereas the ports to the right of the line 268 control the regeneration sequence for the tank 12. During a regeneration cycle, the control disk 120 rotates 180° to effect the complete regeneration cycle of one of the tanks. The location of the ports and their function, as shown in FIG. 2 correspond to the ports shown and described in U.S. Pat. Nos. 3,891,552 and 4,298,025. As fully explained in these earlier patents, the depending wall 248 controls the communication of pressurized water from the pressurized region 249 to the ports or communicates the ports with the drain region 251 to depressurize the respective chambers. The inlet and outlet valves 70, 72, 76 and 78 each include a "top" and a "bottom" port. The "top" ports communicate with the top of the associated operating pistons 88, 90, 96, 98 and the pressurization of these ports apply a valve closing force. Conversely, the "bottom" ports communicate with the underside of the pistons and apply valve opening forces when pressurized.

To facilitate the explanation, the ports shown in FIG. 2A will use the same reference characters as those used for the valves with which they communicate. If a given valve has both an upper and lower port, the upper port will be designated by the same reference character that is used for the valve it controls, followed by a single apostrophe. The bottom port for that valve will be designated by the same reference character followed by a double apostrophe. For valves that only require a single port, i.e., the drain valves 130, 132, the port will be designated by the same reference character that is used for the valve. As an example, the port marked 70' communicates with the region above the piston 88 of the intake valve 70 via signal line f. The port marked 70" communicates with the underside of the piston 88 of the valve 70 via signal line e. The port marked 130 communicates with the drain valve 130 via the signal line b.

Usage disk 118 and the regeneration control disk 120 are preferably rotated by a drive mechanism fully disclosed in U.S. Pat. No. 4,298,025. Referring to both FIGS. 1 and 2, the disks 118, 120 are driven by a ratcheting mechanism that includes a plurality of pawls. As seen best in FIG. 2, the usage disk 118 rotates atop and concentrically with the regeneration control disk 120. The disks 118, 120 each include peripheral ratchet teeth 118a, 120a respectively. The water usage disk 118 is rotated by a pawl arrangement indicated generally by the reference character 270. Both discs rotate in the direction indicated by the arrow 271; an anti-reverse pawl 272 prevents reverse rotation of the disk 118.

The pawl arrangement 270 includes a pair of individual, spring biased pawls 274, 276, concentrically journalled on an eccentric shaft 278. The shaft 278 is coupled to the water usage turbine 118a through a reduction gear train 283 (shown in FIG. 4). In operation, the usage turbine 116a shown in FIG. 1, and hence the water usage disk 118 rotates in proportion to the amount of treated water discharged by the valve assembly 14.

The usage disk 118 also includes an axially depending flange 279 that is interrupted by a plurality of circumferentially spaced slots 279a.

The number and position of the slots 279a determine the frequency of regeneration. The lower pawl 274 of the ratchet mechanism 270 includes a prong 274a that extends into sliding engagement with the flange 279. The prong 274a is sized so that when in engagement with the flange, the pawl 274 is maintained out of engagement with the regeneration control disk 120. When the prong 274a enters one of the slots 279a, the pawl 274 engages the ratchet teeth 120a of the regeneration control disk 120 so that rotation of the eccentric shaft 278 causes concurrent rotation in the disks 118, 120. The initial rotation of the regeneration control disk 120 by the lower pawl 274 causes one of the control valve ports in the port insert 122 to be pressurized by virtue of being uncovered by a depending surface 281, thus initiating regeneration.

When the control valve 140 (shown in FIG. 1) is open, a fluid stream is directed to the regeneration turbine 142 (shown in FIG. 1) located in the turbine chamber 143. The turbine 142 is mechanically coupled to a regeneration drive pawl 284 through a reduction gear train 285 (shown in FIG. 4). The pawl is journalled on an eccentric shaft 286. Rotation of the turbine 142 thus effects incremental rotation of the regeneration control disk 120 and in so doing, effects a regeneration cycle. The regeneration cycle continues until the control port communicating with the control valve chamber 146 via signal line K (shown in FIG. 1) is depressurized thus closing the control valve 140.

During the regeneration cycle, treated water is communicated to the venturi 260a. The flow of water through the venturi draws regeneration solution from the regeneration source 15 via conduit 220.

In a water softening application, the regeneration source 15 typically includes a brine well and brine control valve (not shown). When a predetermined amount of regeneration solution is drawn from the source 15, the brine valve (not shown) closes. The flow of treated water (in this example softened water continues to flow into the regenerated tank for a predetermined amount of time to effect a counterflow rinse. After a predetermined amount of time, the flow of softened water into the tank being regenerated is terminated by depressurizing the appropriate drain piston chamber 150, 152.

Referring in particular to FIGS. 1-4, the process steps will now be discussed in greater detail. As indicated above, a regeneration cycle is initiated when the depending surface 281 uncovers one of the ports communicating with the control valve 140. As seen in FIG. 2A, two control valve ports, separated by 180°, are defined in the insert 122. It should be apparent, the regeneration control disk 120 rotates through an arc of 180° during a regeneration cycle. For purposes of explanation, suppose that tank 10 requires regeneration. As indicated in FIG. 2A, the ports, defined in the insert 122, to the left of the diametral line 268, control the regeneration of tank 10. Movement of the regeneration control disk 120 is initiated by the pawl assembly 270 as explained above. The initial movement in the disk 120 by the pawl 270 causes the depending surface 281 to uncover the control valve port 140.

According to the invention, the control valve 140 is of a two-piece, spring loaded design. The control valve of the prior art was of a single piece construction and it was found, that under certain operating conditions, movement of the control valve downwardly (as viewed in FIG. 1) could stall and, as a result, the control valve would not fully open. It is important that the control valve 140 fully open in order to reduce the possibility of having resin fines or other particulate matter getting caught between the seal and associated seat which would prevent complete closure of the control valve and result in wasted water.

Referring to FIGS. 4-9, the construction of the control valve assembly 140 is illustrated. The improved control valve 140 includes a piston head 500 that mounts a seal 504 which may be a quad ring. A stem 506 is secured to the piston head 502. In the preferred embodiment, the stem 506 is inserted into a keyed bore 510 formed in the piston head 500 and is turned through a predetermined angle, i.e., a quarter turn in order to lock the stem to the piston head. As seen best in FIG. 6, the stem 506 includes a pair of laterally extending lugs 508 which are received by associated key ways formed in the bore 510. Eventually, the stem can be rotated a quarter turn so that the lugs 508 are captured in associated slots 509 formed in the piston head 500. The slots 509 have clearance in the axial direction that determine how much relative movement is permitted between the stem 506 and the piston head 500.

A compression spring 512 is captured in the bore 510 between the top of the stem 506 and the piston head 500 and urges the piston head and stem apart. The lower end of the stem receives a cone-shaped seat 516 and is snapped onto the lower end of the stem 506. A barb 518 locks the seat to the stem 506.

Figure 4:
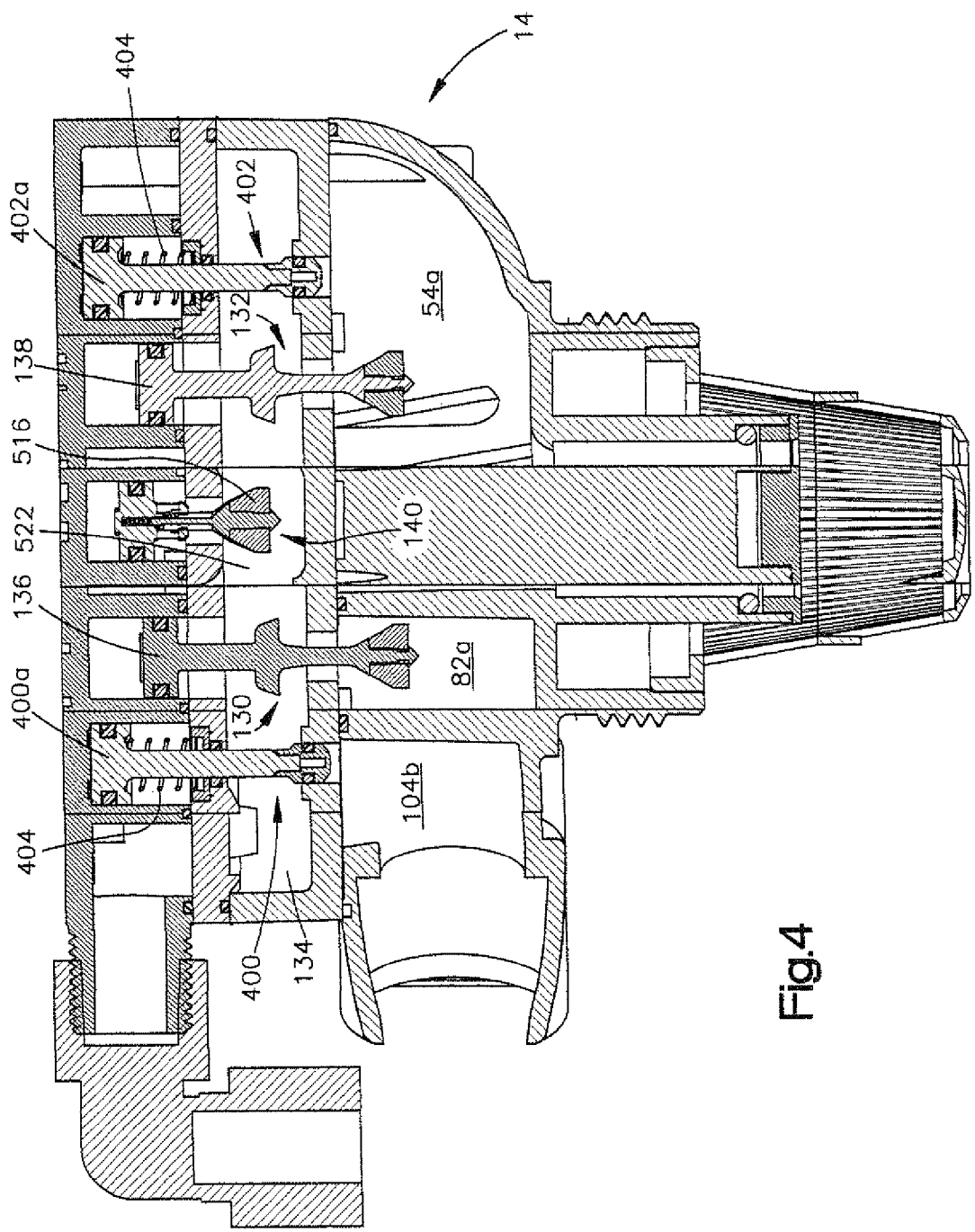
FIG. 4 is another fragmentary, sectional view of the control valve that is shown schematically in FIG. 1.
Figure 5:
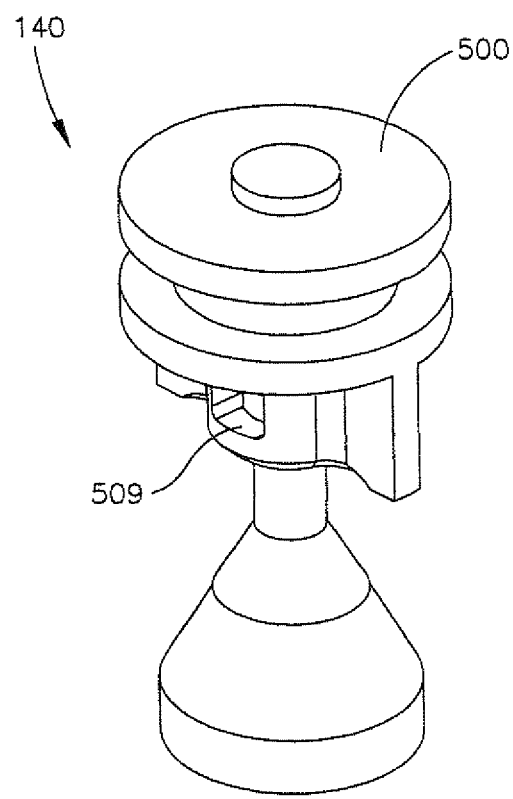
FIG. 5 is a perspective view of a control valve component constructed in accordance with a preferred embodiment of the invention.
Figure 6:
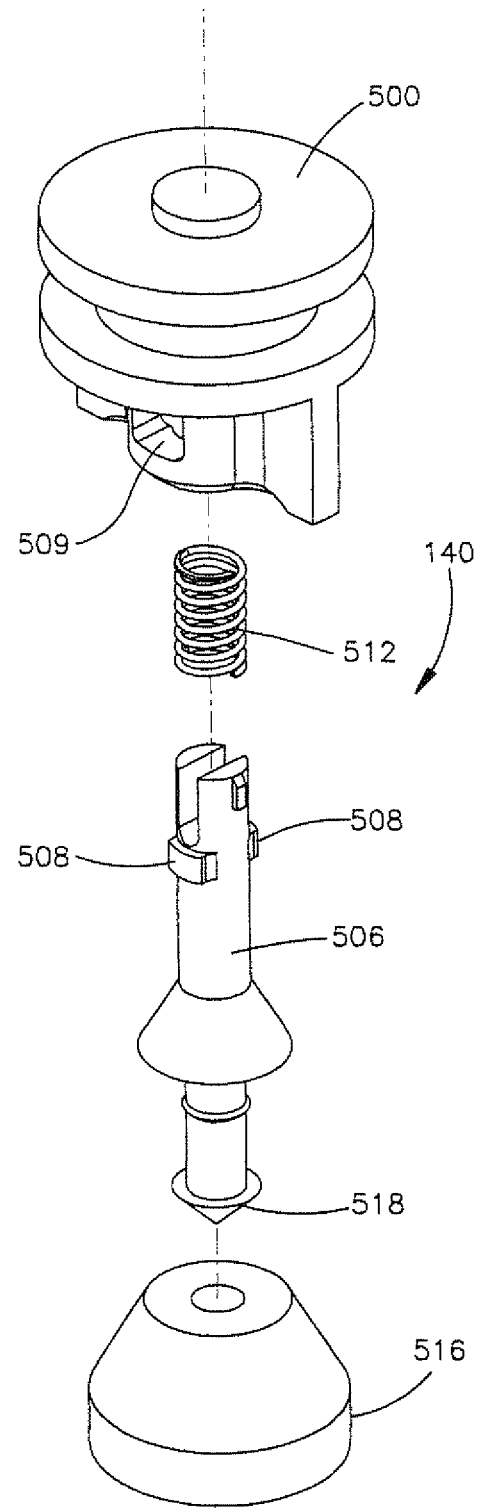
FIG. 6 is an exploded view of the control valve component shown in FIG. 5.
Figure 9:
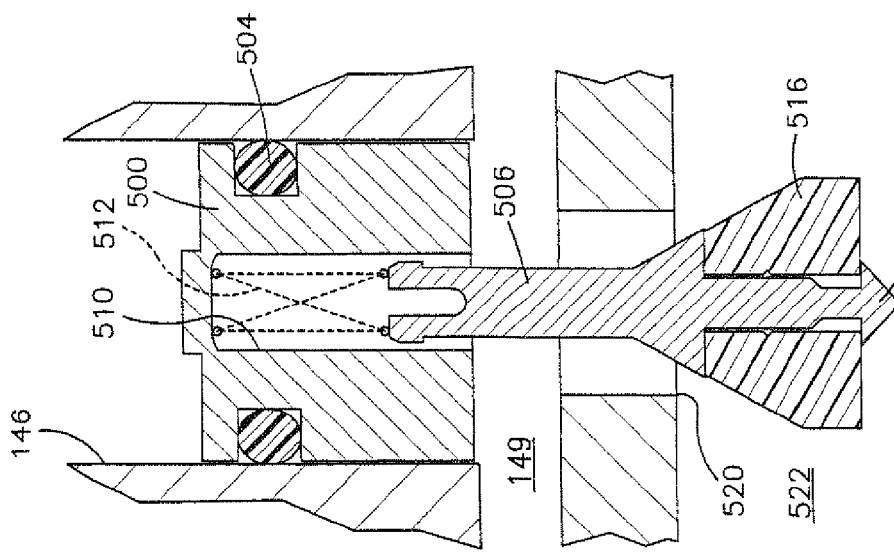
FIGS. 7-9 are fragmentary sectional views showing various operational positions of the control component shown in FIG. 5.
Figure 8:
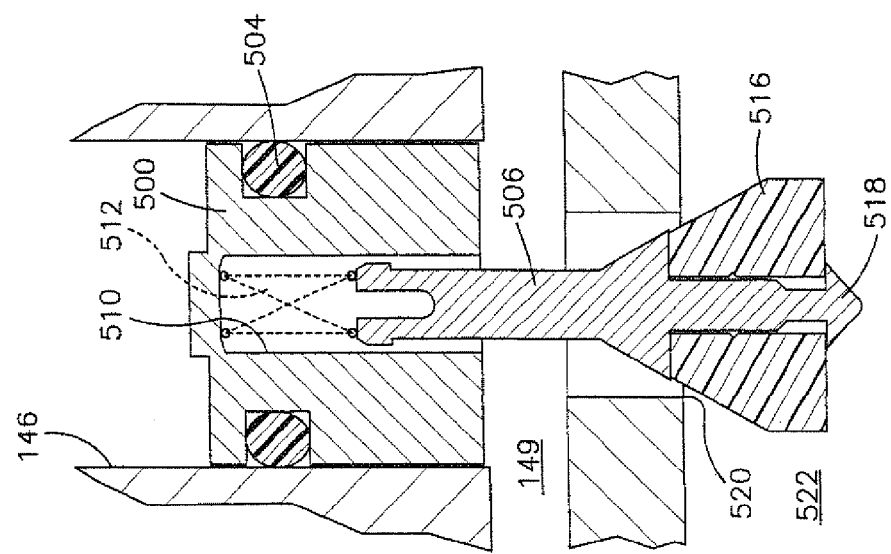
Figure 7:
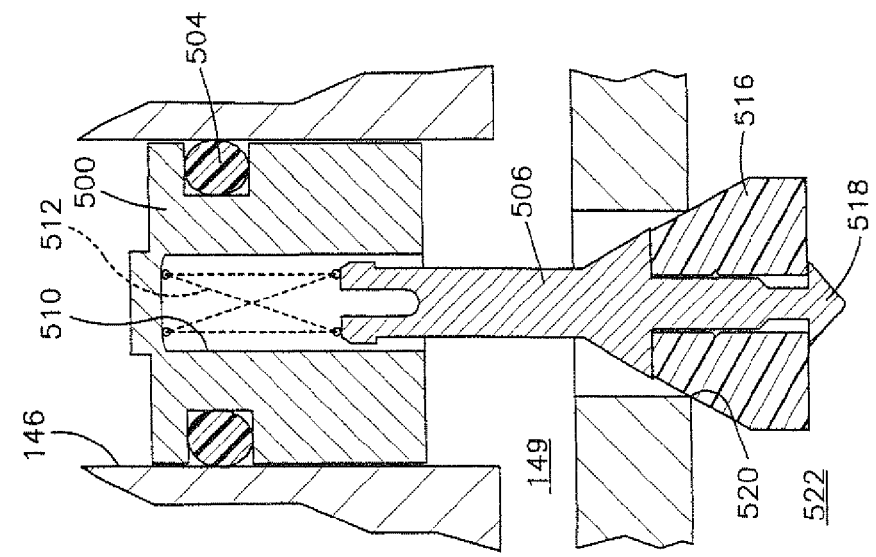

Referring, in particular, to FIGS. 7-9, the operation of the improved control valve assembly 140 is illustrated. When the control valve 140 is to be opened, a pressure signal via signal line K (see FIG. 1) is applied to the top of the piston head 500. The force generated by the signal pressure in the signal line K, urges the piston downwardly against the force of the spring 512 until it moves to the position shown in FIG. 8. During this initial motion, the piston 500 moves relative to the stem 506 and, in effect, the valve remains closed, i.e., the seat 516 remains in contact with its associated seating surface 520 because pressure in a chamber 522 urges the seat into contact with the associated seating surface 520, as seen in FIG. 4. Further movement of the piston head, due to the pressure in signal line K, ultimately urges the piston head 500 downwardly, causing the seat 516 to disengage the seating surface 520, thereby allowing the flow of water from the chamber 522 into the passage 149 (see FIG. 1). The pressure tending to close the seat 516 is relieved once the seat 516 disengages its seating surface 520 and, thus, the spring urges the stem 506 to move downwardly with respect to the piston head 500, thus causing further separation of the seat 516 from its seating surface 520 and, in effect, creating a much larger opening between the seat 516 and the seating surface 520.

At the conclusion of regeneration cycle, the signal line K is depressurized and fluid pressure on the underside of the piston moves the piston head upwardly, thereby causing the seat 516 to re-engage its seating surface 520. This two-stage opening ensures maximum opening of the control valve 140 and reduces the need for tight manufacturing tolerances for the sealing ring 504 and bore 510 in which the piston head 500 is slidably received. Past efforts to improve the operation of the control valve 140 in water treatment applications where low source pressure was present, included carefully controlling the amount of "squeeze" of the sealing ring 104 in order to minimize or lower seal friction between the piston head 500 and the bore 510. At times, this resulted in leakage past the seal ring 504. With the present invention, a reliable opening of the control valve assembly 140 is achieved even in fluid treatment applications where low source pressures are encountered. With the present invention, the "squeeze" of the sealing ring 504 can be increased, while still insuring that the seat 516 moves to a fully open position.

The water treatment unit then goes through several process steps to complete the regeneration cycle. Initially the regeneration solution is passed through the tank being regenerated in a counter-flow direction. This is followed by a slow rinse which is also in the counter-flow direction. More specifically, in the slow rinse step, treated water (i.e. softened water if the unit is a water softener) from the collection chamber 110 is injected into the outlet of the tank being regenerated, travels down the associated riser tube 107 or 109 and then is discharged through the inlet conduit into the drain chamber. Full details of this step of the regeneration process can be found in U.S. Pat. Nos. 4,298,025 and 3,819,522.

A full downflow rinse step only follow the counter-flow rinse step, if desired. The down flow rinse step conveys water through the regenerated tank in a service direction. This step flushes any remaining regeneratant out of the tank while at the same time tending to pack the bed in preparation for placing the tank in service.

To achieve this step, if desired, a pair of purge valves 400, 402 are provided in the control valve 14. The purge valves control the fluid communication between the outlets of the tanks 10, 12 and an ambient drain. More specifically, to effect a downflow rinse of a tank, its associated intake valve is opened, its outlet valve is closed and its associated purge valve is opened. With this valve relationship, source water is communicated to the inlet chamber 74, proceeds into the tank, passes through the water treatment media, and is ultimately discharged from the tank through the associated riser tube. The discharged water is conveyed to drain through an open purge valve associated with the tank. A full discussion of these purge valves and associated components can be found in U.S. Pat. No. 6,214,214, which is hereby incorporated by reference.

The logic and hydraulics for opening and closing the purge valves 400, 402 are obtained from fluid signals being sent to the inlet and outlet valves. For purposes of an explanation suppose that tank 12 is the one being regenerated.

From the above description of the invention, those skilled in the art will perceive improvements, changes and modifications.

Having described the invention, I claim:

1. A water treatment apparatus, comprising:
   a) a pair of water treatment tanks each defining a fluid flow path including a compartment containing water treatment media through which water to be treated is passed;
   b) control means for controlling which of said tanks is on-line and which of said tanks is off-line;
   c) an inlet valve associated with each tank, said inlet valve movable between open and closed positions by a fluid pressure operated inlet valve operating member responsive to at least a first pressurized fluid signal applied to said operating member by said control means;
   d) an outlet valve associated with each tank, said outlet valve movable between open and closed positions by a fluid pressure operated outlet valve operating member responsive to at least a second pressurized fluid outlet signal applied to said operating member by said control means;
   e) monitoring means for determining when an on-line tank requires regeneration; and
   f) regeneration control system, including a regeneration turbine and a fluid pressure operated control valve assembly for controlling the communication of fluid for driving said turbine, said control valve assembly including:
      i) a fluid pressure operated piston head for receiving fluid generated opening forces from a fluid pressure signal linesaid piston head moving in an opening direction only in response to a fluid pressure signal in said fluid pressure signal line, said control valve assembly being only fluid pressure operated and not operable by an externally applied non-fluid pressure force;
      ii) a stem coupled to said head and relatively movable with respect to said head for a predetermined distance;
      iii) a spring urging said stem away from said piston head; and
      iv) a valve seat carried by said stem;
   g) said piston head, stem, spring and seat configured such that, upon receiving said fluid pressure generated opening forces, said piston head initially moves towards said seat, compressing said spring until said seat disengages an associated seating surface, whereupon said spring expands to further move said seat away from said associated seating surface while said piston head is receiving said fluid pressure generated opening forces.

2. The apparatus of claim 1 wherein said stem includes at least one laterally extending lug that is slidably received in an associated slot formed in said piston head, which allows relative movement between said piston head and said stem.

3. The apparatus of claims 1 wherein said stem includes two laterally extending lugs that are slidably received in associated slots formed in said piston head, which allow relative movement between said piston head and said stem.

4. A water treatment apparatus comprising:
   a) at least one water treatment tank defining a fluid flow path extending from a tank inlet to a tank outlet, said treatment tank including water treatment media disposed in said flow path;
   b) regeneration determining apparatus for determining when said treatment media requires regeneration, including a fluid pressure operated, spring-loaded control valve, the control valve comprising a fluid pressure operated piston having a peripheral seal for sealingly engaging an associated bore, said piston defining an effective pressure area for receiving fluid pressure generated opening forces from a fluid pressure signal line, a stem coupled to said piston including one end slidably received in a piston bore and a spring received in said piston bore for urging said stem in an axial direction away from said piston head and a seat secured to another end of the stem said piston head moving in an opening direction only in response to a fluid pressure signal in said fluid pressure signal line, said control valve being only fluid pressure operated and not operable by an externally applied non-fluid pressure force and,
   c) said piston head, stem, spring and seat configured such that, upon receiving said fluid pressure generated opening forces, said piston head initially moves towards said seat, compressing said spring until said seat disengages an associated seating surface, whereupon said spring expands to further move said seat away from said associated seating surface while said piston head is receiving said fluid pressure generated opening forces.

5. The apparatus of claim 4, further including a second treatment tank, and a system controller including means for maintaining one of said tanks on-line, while said other tank is regenerated and then maintained off-line until said one tank requires regeneration.

6. A water pressure operated water treatment apparatus having an inlet connected to a source of water to be treated, said treatment apparatus capable of operating at a low source water pressure comprising:
   a) at least one water treatment tank defining a fluid flow path extending from a tank inlet to a tank outlet, said treatment tank including water treatment media disposed in said flow path;
   b) a system controller for controlling the regeneration of said treatment media including:
      i) a regeneration control turbine;
      ii) a fluid pressure operated multi-stage, spring-loaded control valve assembly for communicating fluid to said regeneration turbine, said control valve assembly having a seat relatively movable with respect to a fluid pressure operated piston head communicating with a fluid pressure signal source such that initial movement in said piston head, in response to a fluid pressure signal, produces movement of said piston head toward said seat while said seat remains engaged with an associated sealing surface, thereby creating a spring force on said seat, whereupon further movement of said piston head, beyond said initial movement, moves said seat away from said associated sealing surface and allows said seat to move in a direction away from said piston head in response to said spring force, said piston head moving in an opening direction only in response to said fluid pressure signal, said control valve assembly being only fluid pressure operated and not operable by an externally applied non-fluid pressure force.

7. The apparatus of claim 6, wherein said control valve assembly includes a stem having one end slidably received in a bore formed in said piston head and a spring acting between said stem and said piston head and located in said piston bore.

* * * * *